Figure 1:
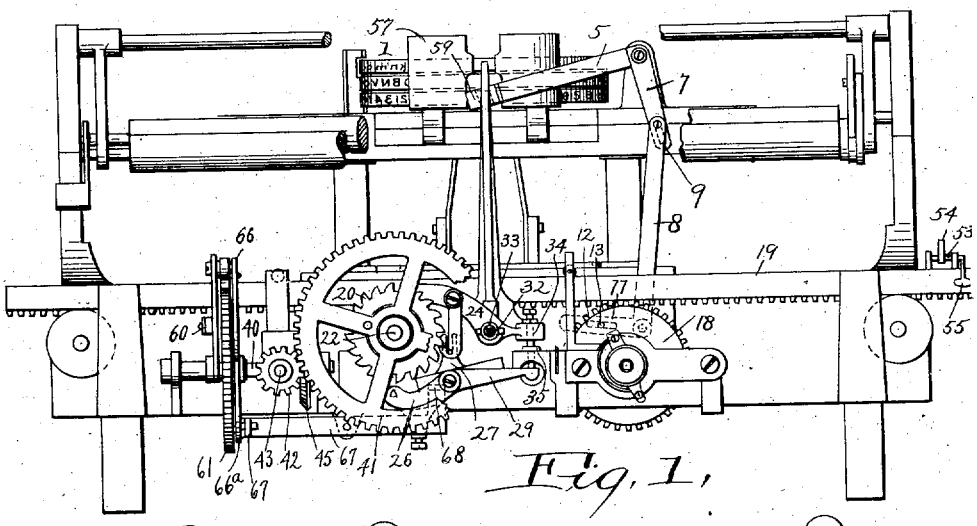

No. 12,190. REISSUED JAN. 12, 1904.

C. SEARS.

TYPE WRITING MACHINE.

APPLICATION FILED JUNE 6, 1901.

3 SHEETS—SHEET 1.

Witnesses.
E. B. Gilchrist
H. M. Wise

Inventor,
Charles Sears,
By his Attorneys,
Thurston & Baker

THE NORRIS PETERS CO., WASHINGTON, D. C.

No. 12,190. REISSUED JAN. 12, 1904.

C. SEARS.

TYPE WRITING MACHINE.

APPLICATION FILED JUNE 6, 1901.

3 SHEETS—SHEET 2.

Witnesses.
E. B. Gilchrist
H. M. Wise

Inventor,
Charles Sears,
By his Attorneys
Thurston & Bates.

THE NORRIS PETERS CO., WASHINGTON, D. C.

No. 12,190. REISSUED JAN. 12, 1904.

C. SEARS.

TYPE WRITING MACHINE.

APPLICATION FILED JUNE 6, 1901.

3 SHEETS—SHEET 3.

Witnesses
E. B. Gilchrist
H. M. Wise

Inventor,
Charles Sears,
By his Attorneys,
Thurston & Bates

THE NORRIS PETERS CO., WASHINGTON, D. C.

No. 12,190. Reissued January 12, 1904.

UNITED STATES PATENT OFFICE.

CHARLES SEARS, OF CLEVELAND, OHIO, ASSIGNOR, BY MESNE ASSIGNMENTS, TO THE SAVINGS & TRUST COMPANY, TRUSTEE, OF CLEVELAND, OHIO.

TYPE-WRITING MACHINE.

SPECIFICATION forming part of Reissued Letters Patent No. 12,190, dated January 12, 1904.

Original No. 644,188, dated February 27, 1900. Application for reissue filed June 6, 1901. Serial No. 63,464.

*To all whom it may concern:*

Be it known that I, CHARLES SEARS, a citizen of the United States, residing at Cleveland, in the county of Cuyahoga and State of Ohio, have invented a certain new and useful Improvement in Type-Writing Machines, of which the following is a full, clear, and exact description, reference being had to the accompanying drawings.

My invention has two primary objects.

First. To dispense with an inking-ribbon in a type-writer of the class which employs an impression-hammer and has the characters on the outer periphery of a type segment or wheel which oscillates about a fixed axis. This part of the invention, as shown, is embodied in a type-writer having a differential escapement for the carriage; but it is obviously capable of use with a type-writer having a uniform escapement, because the machine shown also contains a uniform escapement which forms part of the operating mechanism for the inking-roller arm.

Second. To provide means in a type-writer having a differential escapement and a spring-actuated impression-hammer for causing the hammer-blows to be of uniform force.

The invention consists in the combination of a pivoted arm having an inking-roller mounted in one end and adapted when the arm is swung to contact with the character at the impression-point with an oscillating type wheel or segment, an impression-hammer, and mechanism for swinging said roller-arm after the type-wheel has come to rest in the impression position, so as to cause the roller to ink the character at the impression-point.

It also consists in combining in a single machine which contains a movable carriage and a spring-actuated impression-hammer two independently-operating motors, intermediate mechanisms whereby the carriage is moved by one and the impression-hammer is reset by the other motor, a differential escapement controlling the movements of the carriage, a uniform escapement controlling the movements of the hammer-resetting mechanism, key-levers, and intermediate mechanism whereby the operation of each key-lever trips both escapements.

It also consists in the more specific combinations and subcombinations of parts shown and described herein, as definitely pointed out in the claims.

Figure 2:
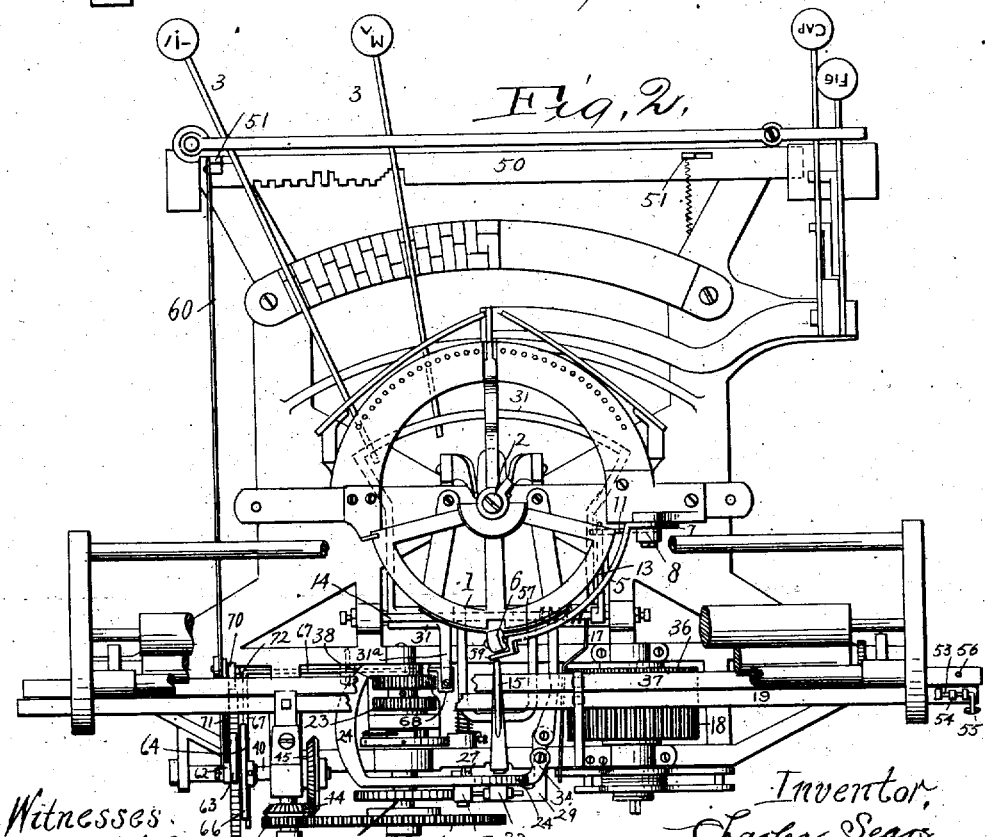
Figure 3:
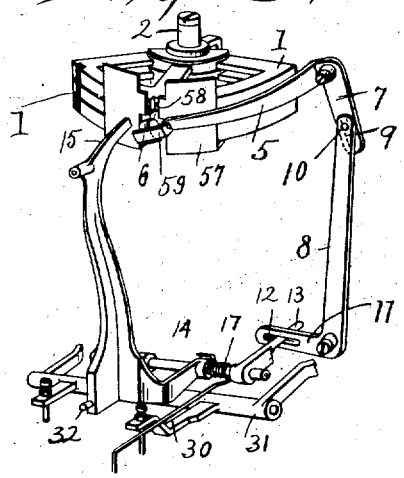
Figure 5:
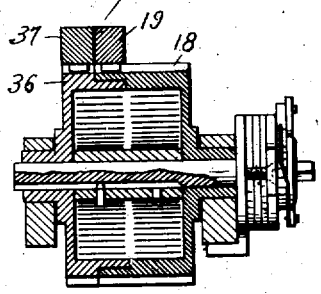
Figure 4:
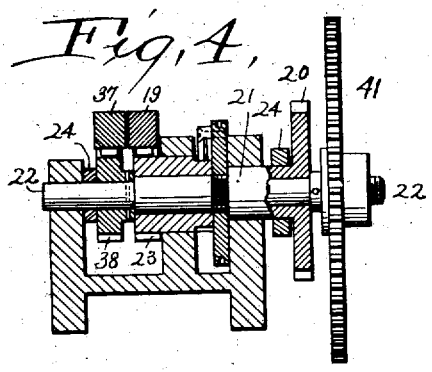
Figure 6:
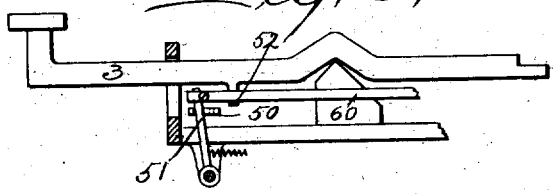
Figure 7:
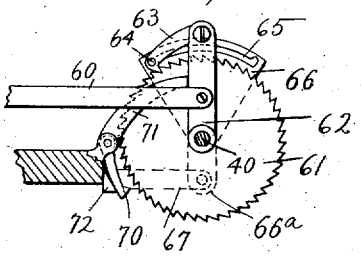
Figure 8:
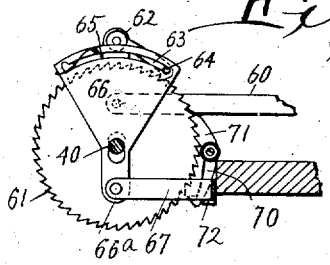
Figure 9:
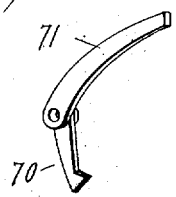
Figure 10:
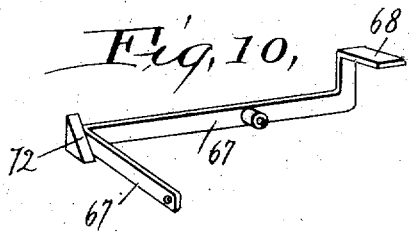

In the drawings, Figure 1 is a rear elevation of a type-writer embodying my invention. Fig. 2 is a plan view thereof. Fig. 3 is a perspective view of the inking-roller arm and hammer and their connections. Fig. 4 is a longitudinal section through the uniform-escapement shaft. Fig. 5 is a longitudinal section through the two spring-barrels. Fig. 6 is a side elevation of a part of one key-lever. Fig. 7 is a side view of a part of the differential-escapement mechanism. Fig. 8 is a view of the same mechanism from the opposite side. Fig. 9 is a perspective view of the retaining-pawl which forms a part of said mechanism, and Fig. 10 is a perspective view of the lever 67.

The machine in which my invention is embodied is in its main features substantially like the Hammond type-writer, which has been on the market for years. It is changed in certain respects, and new parts are added to effect new results, these changes and additions constituting my invention.

The type-segments are indicated by 1, and they are caused to oscillate about the vertical axis 2 in one direction or the other and are brought to rest with the desired one of the characters on their periphery at the impression-point by the finger-keys 3 and the usual connecting devices.

5 represents an arm made of metal as light as is practical. It is pivoted to the frame of the machine and is curved around behind the segments in such manner that the inking-roller 6, which is mounted in its end, will when the arm is rocked upward roll over the character at the impression-point. Normally this roller lies below the segments and just in front of the paper; but whenever a character-key is depressed and the proper character brought to the impression-point and just before the hammer completes its impression-stroke the arm is swung up positively above the segments and out of the way of the paper. In this movement the inking-roller contacts with and inks the type about to be printed. The roller may be covered with felt and saturated with anilin ink.

In the construction shown the arm 5 has a vertical arm 7, which is connected with the vertical arm 8 of a bell-crank lever by a slot 9 in one and a pin 10 in the other. The horizontal arm 11 of said bell-crank lever has a slot 12 into which projects a rod 13, which is secured to and projects forwardly from the hammer rock-shaft 14. The hammer 15 is rigidly fixed to the rock-shaft 14, and a rat-trap spring 17 exerts its force to move the hammer in the impression direction. The construction of the hammer and its operating mechanism is substantially as found in the Hammond type-writer. From the foregoing description it is clear that whenever the hammer is released to the action of its spring and flies forward to make the impression it moves the roller up out of the way of the paper and across the face of the character.

The mechanism for resetting the hammer and for releasing it is substantially the same as is used in the Hammond type-writer; but there is this difference that in the Hammond machine this mechanism for resetting and releasing the hammer is a part of the carriage-feeding mechanism, whereas in my construction it has nothing to do with the carriage mechanism. The hammer-resetting mechanism referred to includes a motor in the form of a toothed spring-barrel 18, a sliding rack-bar 19, which engages with the spring-barrel, and escapement mechanism which governs the movement of the rack-bar. The escapement mechanism includes a ratchet 20, which is secured to a hollow shaft 21, which embraces the shaft 22, a pinion 23, connected to the same hollow shaft and meshing with the rack-bar, a rocking frame 24, mounted axially with respect to the hollow shaft, a pawl 25, mounted on the rocking frame and engaging with the ratchet, a three-arm lever pivoted to the frame of the machine, one arm 26 of which serves as a retaining-pawl for engagement with the ratchet, another arm 27 is slotted, and a pin 28 on pawl 25 enters the slot, while the third arm 29 is the tripping-arm. It is engaged and tripped by an arm 30, secured to a rocking frame 31, which frame is rocked by the key-levers whenever they are depressed. A pin 32 on the hammer engages with the rocking frame. This escapement whenever it is tripped moves a uniform distance, which is in no wise dependent upon the feed movement of the carriage. When a key-lever is depressed, the pawl 25 is released from the ratchet, and thereby the hammer is released to the action of its spring and it makes the impression-blow. When the key-lever is released, the pawl 25 again engages with the ratchet, which being released by the retaining-pawl is rotated by the spring in the spring-barrel until the tailpiece 34 of the frame 24 engages with the stop 35. This movement of the frame 24 withdraws the hammer to the same position it occupied before it was released. The hammer when thus set is always subject to the same force of its operating-spring, and consequently its blows are uniform. If, however, this resetting of the hammer were associated with the movement of the carriage, its blows would not be uniform, because in the machine shown the carriage is not moved uniform distances in its several feed movements, as it is in the Hammond machine, but, on the contrary, is moved differentially by an independent differential escapement distances proportionate to the widths of the characters. This differential-feeding mechanism includes the following parts, viz: an independently-operating motor in the form of a toothed spring-barrel 36, a rack-bar 37, which engages with it and is fast to the carriage, a shaft 22, which passes through the hollow shaft 23, a pinion 38 thereon in engagement with the rack-bar, a differential escapement, and a train of gears connecting the escapement-shaft 40 with the shaft 22. This train of gears consists, as shown, of the gear 41 on shaft 22, a pinion 42 on a shaft 43, and the bevel-gears 44 45, secured, respectively, to the shaft 43 and the escapement-shaft.

Any differential escapement may be employed. The differential escapement which is shown however, is substantially the same as that which is described in my copending application, Serial No. 707,866. It includes a ratchet-wheel 61, which is made fast to the shaft 40, and a selecting-arm 62, which is loosely mounted upon the shaft 40 close to the ratchet and is connected to the swinging frame 51 by the link 60. A selecting-pawl 63 is pivoted to this selecting-arm and engages with the ratchet. This pawl carries a pin 64, which enters a slot 65 in a vertically-movable plate 66. This plate is slotted and embraces the shaft 40, and its lower end or tailpiece 66[a] is pivotally connected with a lever 67, which is in turn pivoted to the frame of the machine. One arm 68 of this lever lies beneath an arm 31[a], which is a part of the rocking frame 31. It will be remembered that whenever a key-lever is depressed this rocking frame is rocked. One of the results of such movement is to press down upon the arm 68 of the lever 67. This lifts the plate 66, which in turn lifts the selecting-pawl 63 out of engagement with the ratchet, whereupon the selecting-arm may be moved backward by the action of the swinging frame 51. The extent of this backward movement is determined by the depth of the slots in the notched bar 50. A retaining-pawl 70 is pivoted to a fixed support. This pawl has a tailpiece 71, which extends above the pivot, and its weight acts to with-draw the pawl 70 from engagement with the ratchet. The end of this tailpiece, however, is in line with the selecting-arm and is adapted to be engaged by said arm when it returns to its normal position. On the lever 67 is a wedge-block 72, which engages behind the pawl 70, and when said lever 67 is moved by the action of the rocking frame 31 this wedge-block forces the pawl 70 into engagement with the ratchet, and thereby prevents the ratchet from moving. When, however, the key-lever is released and the rocking frame 31 returns to its normal position, the spring in the spring-barrel 36 turns said barrel, thereby moving the rack 37 and the carriage attached thereto, which movement is transmitted through the pinion 38 and intermediate mechanism to the shaft 40, which shaft turns backward, carrying the ratchet with it. When the rocking frame 31 returns to its normal position, the plate 64 descends to the position shown in Fig. 7 and the selecting-pawl 63 becomes engaged with the ratchet 61. The backward movement of this ratchet carries the pawl and selecting-arm 62 with it until said selecting-arm engages with the tailpiece 71 of the retaining-pawl, by which it is stopped after it has moved said retaining-pawl into engagement with the ratchet.

It will be understood from the foregoing description that whenever the key-lever is depressed there is a differential movement of the carriage and a uniform movement of the rack-bar 19, and consequently a uniform retraction of the hammer, and consequently a uniform movement of the arm which carries the inking-roller. The two rack-bars move side by side in suitable guideways; but the rack-bar 37, attached to the carriage, will always move farthest when a line is printed. To return both rack-bars and carriage to the starting-point, a rock-shaft 53 may be pivoted to the rack-bar 19. It has an arm 54 which when the rock-shaft is turned by its handle 55 moves in front of a pin 56 on the carriage rack-bar 37, wherefore when the carriage is returned it draws back the other rack-bar 19.

Each of the spring-barrels 18 and 36, together with their associated springs, constitutes a motor, and the function of these motors is, as heretofore stated, to severally impart motion to the hammer-resetting mechanism and to the carriage. It is obvious, however, that any other motor or motors whose movements are capable of being controlled by escapement mechanism might be substituted for the specific motors shown. It is obvious also that the mechanism intermediate of the spring-motor 36 and the carriage and between the motor 18 and the hammer are not in the specific form shown essential to the generic invention. These intermediate mechanisms and the specific escapements may be superseded by other mechanisms and escapements capable of performing corresponding functions without departing from the generic invention. The specific mechanisms shown are thoroughly efficient and are to the extent claimed of my invention; but, as before stated, it is clear that the invention is not limited to the specific form of motors or of mechanism intermediate of them and the carriage and the hammer, respectively.

A curved shield 57 is secured to the frame of the machine, and it lies behind the type segment or wheel, but has an opening 58 directly behind the character at the impression-point, whereby the inking-roller can ink only the character at the impression-point. It will also be noticed that a part 59 of the arm 5 lies behind the roller 6, and it serves as a shield to prevent contact between the roller and paper.

Having described my invention, I claim—

1. In a type-writing machine, the combination of a movable carriage, and a spring-actuated impression-hammer, with two independently-operating motors, intermediate mechanisms whereby the carriage is moved by one motor, and the hammer is reset by the other motor, a differential escapement controlling the movements of the carriage, a uniform escapement controlling the movements of the hammer-resetting mechanism, key-levers, and intermediate mechanism whereby the operation of a key-lever trips both escapements, substantially as and for the purpose specified.

2. In a type-writing machine, the combination of the carriage, mechanism acting constantly on the carriage to draw it in the feeding direction, and a differential escapement which, whenever a key-lever is operated, permits the carriage to be moved a distance proportionate to the width of the corresponding character, with a spring-actuated impression-hammer, a rotatable ratchet under tension to move it in one direction, an escapement therefor which permits uniform movements of said ratchet whenever the key-levers are operated, and connections between said uniform escapement and impression-hammer, substantially as and for the purpose specified.

3. In a type-writing machine having a type segment or wheel which turns upon a fixed axis to bring the characters to the impression-point, and a spring-actuated impression-hammer, with a pivoted arm carrying an inking-roller which is adapted to contact with the character at the impression-point, and mechanism for positively moving said arm to carry said roller into contact with said character after the type segment or wheel has come to rest and before the hammer completes its impression-stroke, substantially as and for the purpose specified.

4. In a type-writing machine having a type segment or wheel which turns upon a fixed axis to bring the character to the impression-point, the combination of an impression-hammer, with an arm carrying an inking-roller and pivoted to a fixed support, which arm normally lies below the type segment or wheel and between it and the paper, and mechanism connecting said hammer and arm whereby the hammer in making its impression-stroke swings the arm upward with the result of causing the inking-roller to contact with the character at the impression-point and to move above the type segment or wheel and out of the way of the paper, substantially as and for the purpose specified.

5. In a type-writing machine having a type segment or wheel which turns upon a fixed axis to bring the characters to the impression-point, the combination of an arm pivoted to a fixed support and extending around behind the type segment or wheel and having an inking-roller mounted on its free end, said lever having an angle-arm, a bell-crank lever pivoted to a fixed support, a pin-and-slot connection between the angle-arm and one arm of said bell-crank lever, with a spring-actuated impression-hammer, a rock-shaft to which said hammer is attached, a forwardly-projecting arm attached to said rock-shaft and entering a slot in the horizontal arm of the bell-crank lever, and means for resetting said hammer and for releasing it to the action of its spring.

6. In a type-writing machine, the combination of the carriage, mechanism acting constantly on the carriage to draw it in the feeding direction, a differential escapement which, whenever a key-lever is operated permits the carriage to be moved a distance proportionate to the width of the corresponding character, a spring-actuated impression-hammer, a rotatable ratchet under tension to turn it in one direction, an escapement therefor which whenever the key-levers are operated permits uniform movements of said ratchet, and connections between the impression-hammer and said uniform escapement mechanism, with a pivoted arm carrying an inking-roller which is adapted to contact with the character at the impression-point, and mechanism intermediate of said arm and the hammer whereby the movement of the hammer causes a movement of the arm carrying the inking-roller, substantially as and for the purpose specified.

In testimony whereof I have signed my name to this specification in the presence of two subscribing witnesses.

CHARLES SEARS.

Witnesses:
E. L. THURSTON,
E. B. GILCHRIST.